March 8, 1927.
C. T. MYERS
1,620,278
MAGAZINE LUBRICATING MEANS
Filed Nov. 15, 1923  2 Sheets-Sheet 1
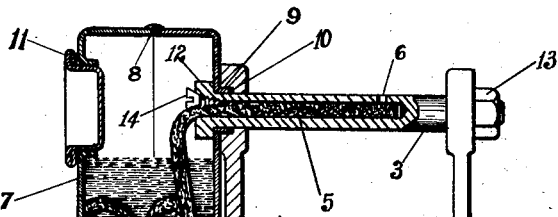
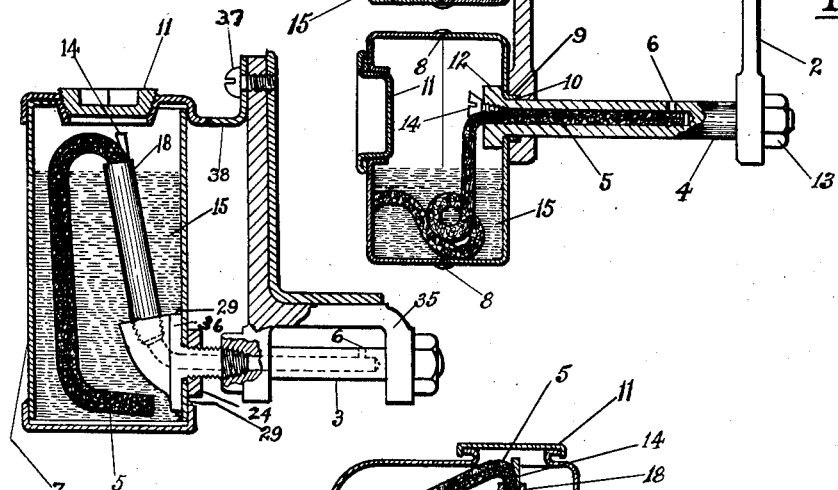
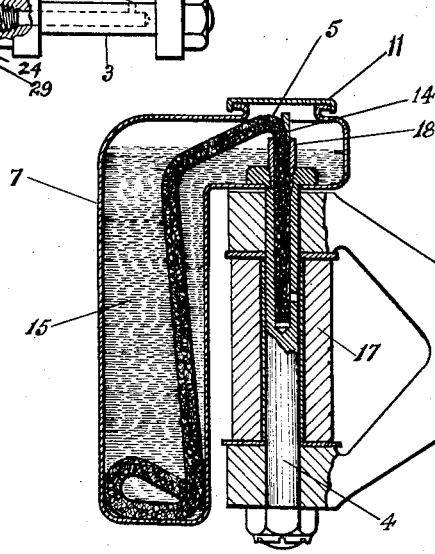
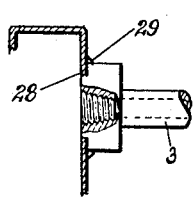
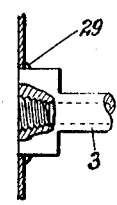
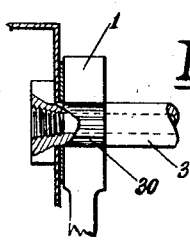
INVENTOR
CORNELIUS T. MYERS
BY
ATTORNEY March 8, 1927. 1,620,278
C. T. MYERS
MAGAZINE LUBRICATING MEANS
Filed Nov. 15, 1923  2 Sheets-Sheet 2

INVENTOR
CORNELIUS T. MYERS
BY
A. D. T. Libby
ATTORNEY

Patented Mar. 8, 1927.

1,620,278

UNITED STATES PATENT OFFICE.

CORNELIUS T. MYERS, OF AVENEL, NEW JERSEY.

MAGAZINE LUBRICATING MEANS.

Application filed November 15, 1923. Serial No. 674,872.

This invention relates to means for oiling or lubricating bearings of various kinds especially those on automotive vehicles, particularly spring shackle bolts and other bearings, all of which have been found in the past to be hard to lubricate with grease which has in the majority of cases been used heretofore. All such exposed bearings as spring shackle bolts on automotive vehicles are subject to the attacks of dust, dirt, gravel, water, etc. which work their way into these bearings, which are more or less exposed causing the grease to harden and thereby prevent lubrication, or in many cases the grit and dirt gets into the bearings and they are quickly worn out, as well as being continuously noisy.

In my patents, 1,314,689 issued September 2, 1919, and 1,387,295 issued August 9, 1921, I have shown and described some of the fundamentals of my lubricating means. In these patents the lubricant reservoir is built in as a part of the fitting. In my application, Serial No. 656,386, filed August 8, 1923, I have disclosed a lubricating means in which one of the chassis fittings, such as the spring shackle, forms only a part of the wall of the reservoir. My present invention is directed to a further improvement in which the entire reservoir is constructed as a unit by itself, which unit may be attached to the required part.

It is, therefore, the principal object of this invention to provide lubricating means, simpler and more readily applied to the vehicle than in my previous application, at the same time retaining many of the advantages therein derived, such as greater economy of lubricant, by feeding the bearings just sufficiently to keep them in nice smooth operating condition, without any waste of lubricant and to provide means for regulating and controlling the flow of lubricant to the bearings.

It is to be understood that the drawings attached hereto and forming part of this specification, are merely illustrative of some of the ways in which my invention may be utilized. In the drawings—

Figure 1 shows a partly sectional view of an individual reservoir and lubricating means attached to each of the bolts of a set of spring shackles.

Figure 2 shows a partly sectional view of a reservoir and lubricating means attached to an axle steering pivot.

Figures 10 and 11 show other means of attaching the reservoir to the head of the spring bolt.

Figure 12 shows a reservoir carried against the spring shackle as in Fig. 6, but with means for preventing the spring bolt from turning.

Figure 13 is a modified form of Fig. 7, showing an additional support for the reservoir to the bolt support member.

Figure 3:
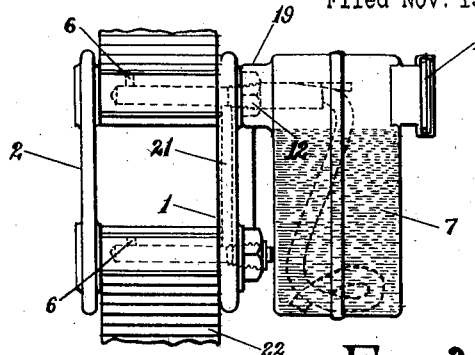
Figure 3 shows an individual reservoir and lubricating means attached to one bolt of a pair of spring shackles, the other bolt being lubricated through a passage in one of said shackles.

Referring now to the details, wherein like numbers refer to corresponding parts in the various views, 1 and 2 illustrate a pair of shackles in which the pins or bolts 3 and 4 are supported or have their bearings. The parts carried on the pins 3 and 4 are omitted for the sake of clarity, although it may be said that usually each of these pins carry suitable bearing bushings and a leaf of the spring is around pin 4 and the frame of the bracket around the pin 3. Each of the pins 3 and 4 is provided with a substantially circular port in which the wick 5 is positioned. Openings 6 lead from the circular ports outward to the bearings or bearing bushings. It will be understood that the openings 6 may be arranged in size and number to suit the requirements. The lubricant reservoir 7 is preferably made in two pieces which are welded or otherwise fastened together at 8.

The reservoir 7 of Fig. 1 has two openings substantially in alinement; one of these openings is formed by a projection 9 that extends into a recessed shackle member. A gasket 10 is also used to insure an oil tight joint. The other opening in the reservoir 7 is closed by a cap 11. This construction enables the bolt to be passed through both openings for the purpose of assembling. The head 12 of the bolt engages the inner wall of the reservoir and when the nut 13 is drawn up, the reservoir is pulled securely into operative position. In order to control the flow of lubricant through the wick to the port, I have shown a screw device 14 as described in my aplication previously referred to. In the structure shown in Fig. 1, the lubricant 15 is placed in the reservoir, after the latter has been assembled on the spring bolt, to the height of the filler opening.

In Fig. 2, 16 is a tie-rod yoke carrying the steering pivot bearing member 17. In this view, the oil controlling member 14 is shown in the form of a wedge, such as described in my pending application previously referred to, also a tube 18 is used to guide and support the wick into the oil port.

Figure 4:
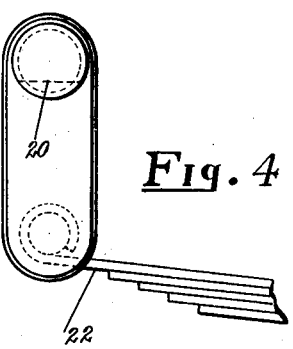
Figure 4 is an end view of Fig. 3.
Figure 5:
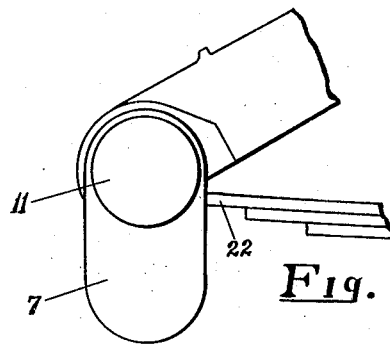
Figure 5 shows the application of an individual reservoir to the spring horn or front of the frame of an automobile.

In Fig. 3 the oil reservoir 7 has at least one projection 19 formed outwardly, with a flat side shown by dotted line 20 in Fig. 4, and the bolt-head 12 is adapted to engage the flat face 20 to prevent the bolt from turning. The shackle 1 is provided with a passageway 21 shown in dotted lines to carry oil from the upper pin to the lower pin. This construction provides for one filler cap 11. A portion of the spring 22 is shown attached to the lower pin of the shackle.

Figure 6:
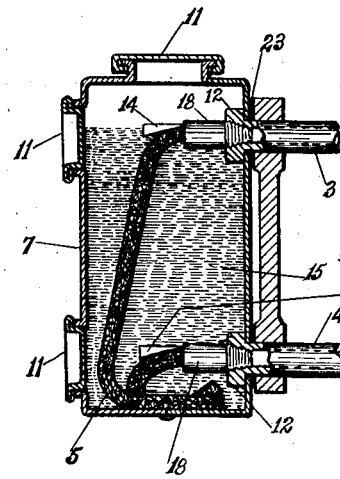
Figure 6 shows a single reservoir engaging both bolts of a spring shackle.

In Fig. 6, the reservoir 7 is made of sufficient size to engage both of the pins 3 and 4; gaskets 23 being used to insure a good oil joint around the pins, the other details being similar to those described with reference to Fig. 2.

Figure 7:
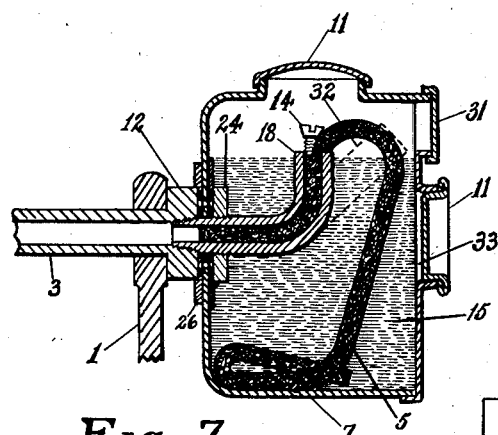
Figure 7 shows how an individual reservoir, as shown in Fig. 1, may be attached to a spring bolt.
Figure 8:
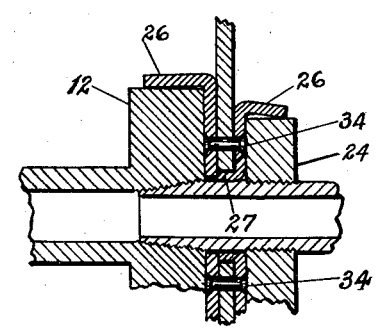
Figure 8 is an enlarged sectional detailed view of one means for locking the reservoir to the spring bolt in the construction shown in Fig. 7.

In Fig. 7 the reservoir 7 has an opening adapted to be closed by the outer surface of the bolt-head 12, instead of by the inner surface of said bolt-head as in Figs. 1, 2, 3 and 6. In Fig. 7 the tube 18, in addition to the screw threads on the end which are usually in the form of pipe threads, has additional machine screw threads adapted to carry a nut 24, which clamps the reservoir 7 against the head 12 of the bolt 3.

Figure 9:
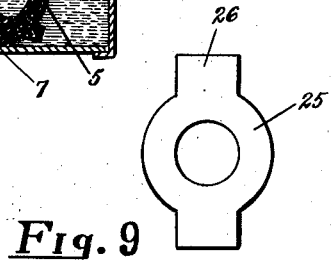
Figure 9 is a detail of the locking means shown in Fig. 8.

In order to prevent the tube 18 or the reservoir 7 from rattling loose, I provide locking means, preferably of the form shown in Fig. 9, wherein a flat member 25 is provided. I prefer to use two of these members 25, each of which may be of suitable size, one inside and one outside the reservoir 7, and to spot weld these members directly to the side wall of the reservoir. After the reservoir has been put in place and the nut 24 drawn up, then the lips 26 on the outside member are bent over the bolt-head 12, while the lips on the inside member are bent downward over the nut 24 to lock the nut 24 and the reservoir 7 in position on the bolt. If desired one of the members 25 may have a projection 27.

The filler cap may be placed on the side of the reservoir as indicated at 31, in which case the tube 18 is bent to the position indicated by the dotted line 32, so that the regulating device 14 may be adjusted through the opening when the cap 31 is removed. In this form of reservoir an additional opening 33 is preferably provided for the purpose of assisting in assembling the lubricating means on the bolt.

It will be readily understood that the reservoir 7 may be supported in other ways than those described; as for example in Fig. 10, an annular part is cut away on the bolt-head, and the reservoir 7 is adapted to fit in the cut-away space, being held thereto as by sweating the metal as at 28 or welding as indicated at 29, or the reservoir may fit over the head of the bolt as shown in Fig. 11, being sweated or welded thereto as indicated at 29. In Fig. 12 the bolt 3 is provided with knurls 30 adapted to engage the shackle member 1 to prevent the bolt from turning.

In Figure 13 the bolt 3 is carried by bracket member 35 and the reservoir 7 is connected to the bolt through the medium of fitting 36, which acts as an extension for the tube 18. The fitting 36 is welded or soldered to the reservoir 7 as at 29. The reservoir has a further support to the bolt supporting member by lug 38, which may be a part of the cover to the reservoir, screws 37 being shown to hold the lug 38 in place against the member 35. If required the nut 24 may be used to additionally clamp the fitting 36 to the reservoir 7.

From what has been said it will be readily understood that these separate unity reservoirs may be quite readily applied to vehicles now in operation and it will further be appreciated that the details of the construction may be varied over quite wide limits, without departing from the spirit of my invention and the scope of the appended claims.

Having thus described my invention, what I claim is:

1. In a magazine lubricating means, a bolt having a surface to be lubricated, a member adapted to aid in the support of said bolt, said bolt having a port leading to a bearing surface on the bolt, a second member constituting a fluid lubricant supply reservoir fastened to the first member by said bolt, and means for feeding fluid lubricant from the reservoir to said port for the purpose described.

2. In a magazine lubricating means, a bolt having a surface to be lubricated, a member adapted to aid in the support of said bolt, said bolt having a port leading to a bearing surface on the bolt, a second member constituting a fluid lubricant supply reservoir fastened to the first member through the medium of the head of said bolt and means including a wick for feeding fluid lubricant from the reservoir to said port for the purpose described.

3. In a magazine lubricating means, a bolt having a surface to be lubricated, a member adapted to aid in the support of said bolt, said bolt having a port leading to a bearing surface on the bolt, a second member constituting a fluid lubricant supply reservoir formed with an opening for the bolt, said bolt serving to close said opening and to fasten the reservoir to the first member and means for carrying fluid lubricant from the reservoir to said port.

4. A magazine lubricating means, comprising a fluid lubricant reservoir, a supporting member, a member having a support in said support member and also having a surface to be lubricated, said second member passing through a wall of the reservoir and having a part for clamping the reservoir to said support member and means for feeding fluid lubricant from the reservoir through at least a part of said second mentioned member to the surface to be lubricated.

5. A magazine lubricating means, comprising a fluid lubricant reservoir, a supporting member, a member having a support in said support member and also having a surface to be lubricated, said reservoir having two openings substantially in alignment, said second member adapted to be passed through one opening and partly through the other and having a part for clamping the reservoir, around said second opening, to said support member and a wick for feeding fluid lubricant from the reservoir through at least a part of said second mentioned member to the surface to be lubricated.

6. In a magazine lubricating means, a bolt having a surface to be lubricated, a member adapted to aid in the support of said bolt, said bolt having a port leading to a bearing surface on the bolt, a fluid lubricant supply reservoir having at least one depression formed to fit the head of the bolt to prevent turning thereof, said bolt passing through one wall of the reservoir and thereby supporting the same and a wick for feeding fluid lubricant in the reservoir to said port.

7. In a magazine lubricating means, a bolt having a surface to be lubricated, a member adapted to aid in the support of said bolt, said bolt having a port leading to a bearing surface on the bolt, a fluid lubricant supply reservoir having at least one depression formed to fit around the bolt so as to prevent turning thereof, and means for feeding fluid lubricant in the reservoir to said port.

8. In a magazine lubricating means, a bolt having a surface to be lubricated, a member adapted to aid in the support of said bolt, said bolt having a port leading to a bearing surface on the bolt, a fluid lubricant supply reservoir separate from said support member but held in operative relation thereto by said bolt, a wick in the reservoir extending into said port and means for preventing the bolt from turning.

9. In a magazine lubricating means, a bolt having a surface to be lubricated, a member adapted to aid in the support of said bolt, said bolt having a port leading to a bearing surface on the bolt, a fluid lubricant supply reservoir separate from said support member but held in operative relation thereto by said bolt, a wick in the reservoir extending into said port, and means for preventing the bolt from turning including a depression in the reservoir, said depression having a flat side and a flat side on the head of said bolt.

10. In a magazine lubricating means, a bolt having a surface to be lubricated, a member adapted to aid in the support of said bolt, said bolt having a port leading to a bearing surface on the bolt, a fluid lubricant supply reservoir formed separately from said support member and having two openings substantially in alignment through which said bolt will pass, said bolt serving to support the reservoir and close one opening, readily removable means for closing the other opening and a wick in the reservoir to feed fluid lubricant therein to said port.

11. In a magazine lubricating means, a bolt having a surface to be lubricated, a member adapted to aid in the support of said bolt, said bolt having a port leading to a bearing surface on the bolt, a second member constituting a fluid lubricant supply reservoir constructed with an opening in one side for engagement with one side of the head of said bolt whereby said opening is closed, said bolt head assisting in holding the reservoir in operative position, a wick for carrying fluid lubricant from the reservoir to said port, and means for controlling the flow of fluid lubricant from the wick to the port.

12. In a magazine lubricating means, a bolt having a surface to be lubricated, a member adapted to aid in the support of said bolt, said bolt having a port leading to a bearing surface on the bolt, said port entrance to the bolt being screw threaded and having a tube screwed therein, a fluid lubricant supply reservoir constructed separately from said support member and adapted to fit over the tube and be held to the bolt by the tube, additional means for holding the reservoir in operative position with respect to the bolt supporting member, and a wick in the reservoir extending into the tube for feeding fluid lubricant to said port.

In testimony whereof. I affix my signature.

CORNELIUS T. MYERS.